United States Patent
Seo et al.

(10) Patent No.: US 9,658,374 B2
(45) Date of Patent: May 23, 2017

(54) POLARIZATION MEMBER AND DISPLAY APPARATUS INCLUDING THE SAME

(71) Applicant: SAMSUNG DISPLAY CO., LTD., Yongin, Gyeonggi-Do (KR)

(72) Inventors: Eun Mi Seo, Chungcheongnam-do (KR); Na Young Shin, Gyeonggi-do (KR); Kyung Hwan Jeon, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/697,280

(22) Filed: Apr. 27, 2015

(65) Prior Publication Data

US 2016/0154155 A1    Jun. 2, 2016

(30) Foreign Application Priority Data

Dec. 2, 2014 (KR) ........................ 10-2014-0170326

(51) Int. Cl.
| | | |
|---|---|---|
| *G02F 1/1335* | (2006.01) | |
| *G02B 5/26* | (2006.01) | |
| *G02B 5/20* | (2006.01) | |
| *G02B 5/30* | (2006.01) | |
| *G02B 27/28* | (2006.01) | |

(52) U.S. Cl.
CPC .............. *G02B 5/26* (2013.01); *G02B 5/208* (2013.01); *G02B 5/3033* (2013.01); *G02B 27/286* (2013.01); *G02F 1/133502* (2013.01); *G02F 1/133528* (2013.01); *G02F 2202/28* (2013.01)

(58) Field of Classification Search
CPC ........ G02B 5/26; G02B 5/3016; G02B 5/208; G02B 5/3033; G02B 27/286; G02F 1/133528; G02F 1/13363; G02F 2202/28; G02F 1/133502

See application file for complete search history.

(56) References Cited

U.S. PATENT DOCUMENTS

| | | | | |
|---|---|---|---|---|
| 2013/0002994 | A1* | 1/2013 | Wang | ................ G02F 1/133502 |
| | | | | 349/96 |
| 2013/0044282 | A1* | 2/2013 | Kuwabara | ............. G02F 1/1333 |
| | | | | 349/96 |
| 2014/0111859 | A1* | 4/2014 | Duraes | ................... G02B 5/305 |
| | | | | 359/487.02 |

(Continued)

FOREIGN PATENT DOCUMENTS

| | | |
|---|---|---|
| KR | 1020050051089 | 6/2005 |
| KR | 1020050104471 | 11/2005 |

(Continued)

*Primary Examiner* — Nathanael R Briggs
(74) *Attorney, Agent, or Firm* — F. Chau & Associates, LLC (57) ABSTRACT

A first polarizing member includes a polarizing layer, a phase difference layer and an infrared reflective layer. The polarizing layer linearly polarizes light and emits polarized light. The phase difference layer changes a polarization state of the polarized light. The infrared reflective layer is interposed between the polarization layer and the phase difference layer, wherein the polarized light passes through the infrared reflective layer and infrared rays are reflected from the infrared reflective layer.

14 Claims, 4 Drawing Sheets

(56) References Cited

U.S. PATENT DOCUMENTS

| | | | | |
|---|---|---|---|---|
| 2014/0368766 A1* | 12/2014 | Shibata | .................. | G02B 5/201 349/61 |
| 2015/0168622 A1* | 6/2015 | Hamada | ................. | G02B 5/208 359/352 |
| 2015/0192716 A1* | 7/2015 | Kosaka | ................... | B32B 27/06 359/359 |
| 2015/0378079 A1* | 12/2015 | Takagi | ...................... | B32B 7/02 359/489.07 |
| 2016/0082697 A1* | 3/2016 | Hara | ....................... | C03C 17/34 428/212 |

FOREIGN PATENT DOCUMENTS

| | | |
|---|---|---|
| KR | 1020070077707 | 7/2007 |
| KR | 1020090051795 | 2/2015 |
| KR | 1020150014656 | 2/2015 |

\* cited by examiner

POLARIZATION MEMBER AND DISPLAY APPARATUS INCLUDING THE SAME

CROSS-REFERENCE TO RELATED APPLICATION

This application claims priority under 35 U.S.C. §119 to Korean Patent Application No. 10-2014-0170326, filed on Dec. 2, 2014 in the Korean Intellectual Property Office, the disclosure of Which is incorporated by reference herein in its entirety.

TECHNICAL FIELD

The present invention relates to a polarization member, and a display device including the same.

DISCUSSION OF RELATED ART

Liquid crystal displays include a liquid crystal display panel for displaying an image and a backlight assembly for providing light to the liquid crystal display panel. The liquid crystal display panel includes an array substrate having pixels for displaying an image, an opposing substrate coupled with the array substrate, and a liquid crystal layer interposed between the array substrate and the opposing substrate. Liquid crystal displays also includes a polarizer for polarizing light incident on the liquid crystal displays and/or emitting from the liquid crystal displays.

SUMMARY

According to an exemplary embodiment of the present invention, a first polarizing member includes a polarizing layer, a phase difference layer and an infrared reflective layer. The polarizing layer linearly polarizes light and emits polarized light. The phase difference layer changes a polarization state of the polarized light. The infrared reflective layer is interposed between the polarization layer and the phase difference layer, wherein the polarized light passes through the infrared reflective layer and infrared rays are reflected from the infrared reflective layer.

According to an exemplary embodiment of the present invention, a second polarizing member includes a polarizing layer, a phase difference layer, an infrared reflective layer and a surface treatment coating layer. The surface treatment coating layer is disposed on the phase difference layer, wherein the phase difference layer is interposed between the surface treatment coating layer and the infrared reflective layer According to an exemplary embodiment of the present invention, a display device includes a display panel and a polarizing member. The display panel emits light to display an image. The polarizing member is disposed on the display panel, polarizing light emitted from the display panel. The polarizing member has a configuration of the first polarizing member or the second polarizing member.

BRIEF DESCRIPTION OF THE DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Hereinafter, for the convenience of description, a display device will be described with reference to a liquid crystal display, but the present invention is not limited thereto. For example, the display device may include an electrophoretic display; an organic light emitting display, an electro luminescent (EL) display, a field emission display, a surface-conduction electron-emitter display, a plasma display, or a cathode ray display.

Figure 1:
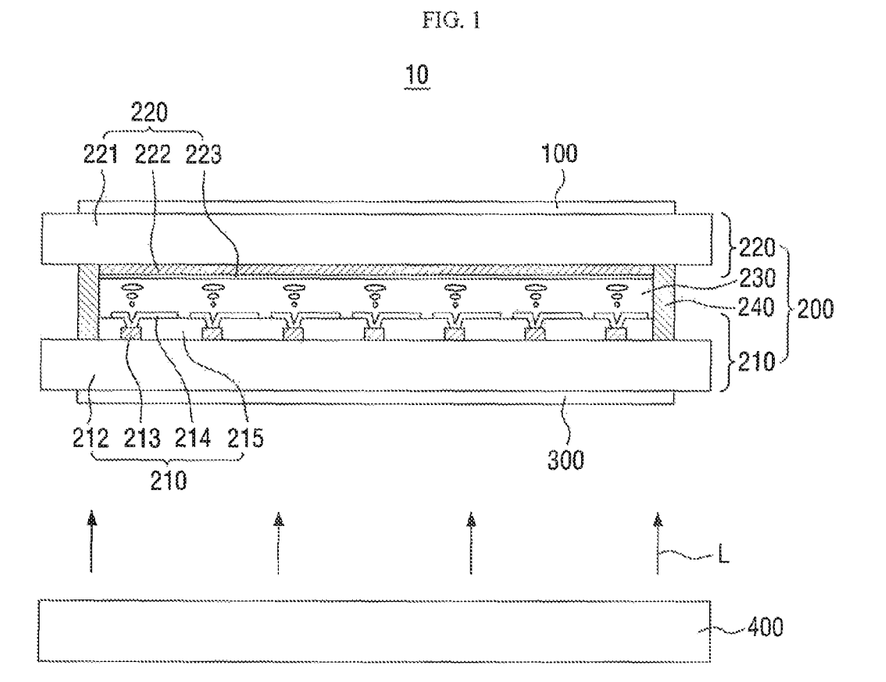
FIG. 1 is a cross-sectional view illustrating a liquid crystal display according to an exemplary embodiment of the present invention.

FIG. 1 is a cross-sectional view illustrating a liquid crystal display according to an exemplary embodiment of the present invention.

Referring to FIG. 1, a liquid crystal display 10 includes a liquid crystal display panel 200 having a first surface and a second surface, and displaying an image by using light, a first polarizing plate 100 disposed on the first surface of the liquid crystal display panel 200, a second polarizing plate 300 disposed on the second surface of the liquid crystal display panel 200, and a backlight assembly 400 for providing light L to the liquid crystal display panel 200.

The liquid crystal display panel 200 includes an array substrate 210, an opposing substrate 220 coupled with the array substrate 210, a liquid crystal layer 230 interposed between the array substrate 210 and the opposing substrate 220, and a sealant 240 for coupling the array substrate 210 and the opposing substrate 220. The array and opposing substrates 210 and 220 face each other.

The array substrate 210 includes a first base substrate 212 in which a plurality of pixel areas for displaying an image is defined, a thin film transistor 213 formed on each, pixel area, a pixel electrode 214 formed in each pixel area and electrically connected with the thin film transistor 213, and an insulating layer 215 formed on the first base substrate 212 and covering the thin film transistor 213.

The opposing substrate 220 is provided on the array substrate 210. The opposing substrate 220 includes a second base substrate 221, a color filter layer 222 disposed on a lower surface of the second base substrate 221 and expressing a predetermined color by using light, and a common electrode 223 formed on the color filter layer 222 and outputting a common voltage. The liquid crystal layer 230 may adjust transmissivity of light L provided from the backlight assembly 400 according to an electric field formed between the pixel electrode 214 and the common electrode 223.

The second polarizing plate 300 is disposed between the liquid crystal display panel 200 and the backlight assembly 400, The second polarizing plate 300 polarizes light L emitted from the backlight assembly 400 and provides the polarized light to the liquid crystal display panel 200.

The first polarizing plate 100 may polarize light emitted from the liquid crystal display panel 200 in a direction orthogonal to the second polarizing plate 300. Hereinafter, a structure of the first polarizing plate 100 will be described in more detail.

Figure 2:
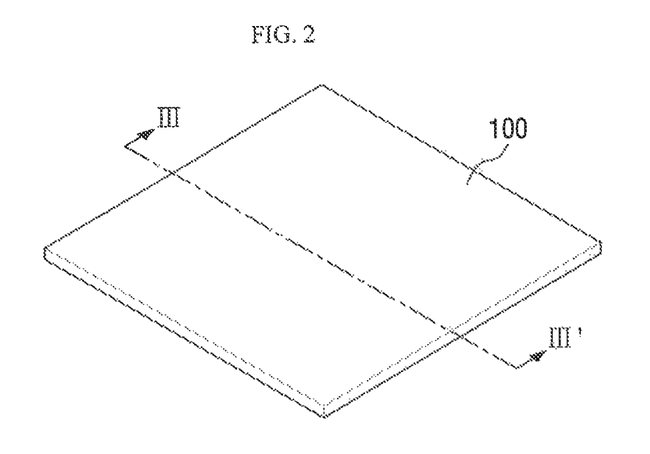
FIG. 2 is a perspective view illustrating a first polarizing plate of the liquid crystal display according to an exemplary embodiment of the present invention.
Figure 3:
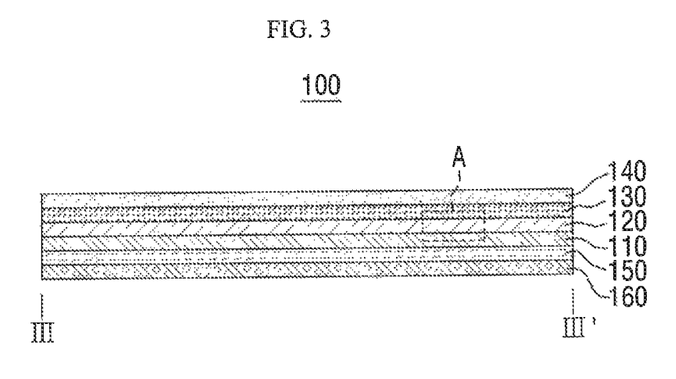
FIG. 3 is a cross-sectional view taken along line III-III' of FIG. 2 according to an exemplary embodiment of the present invention.

FIG. 2 is a perspective view illustrating the first polarizing plate of the liquid crystal display according to an exemplary embodiment of the present invention. FIG. 3 is a cross-sectional view taken along line III-III of FIG. 2 according to an exemplary embodiment of the present invention.

Referring to FIG. 2, the first polarizing plate 100 of the liquid crystal display 10 may be an optical sheet having a quadrangular shape as illustrated in FIG. 2. However, the shape of the first polarizing plate 100 is not limited to the quadrangular shape.

Referring to FIG. 3, the first polarizing plate 100 includes a polarizing layer 110, an infrared reflective layer 120, a phase difference layer 130, a surface treatment coating layer 140, a passivation layer 150, and an adhesive layer 160.

The infrared reflective layer 120 is disposed on one side of the polarizing layer 110, and the phase difference layer 130 is disposed on one side of the infrared reflective layer 120. For example, the first polarizing plate 100 includes a structure in which the polarizing layer 110, the infrared reflective layer 120, and the phase difference layer 130 are stacked on each other.

The polarizing layer 110 may have a transmissive axis, in which light is transmissive, and linearly polarize and emit light incident from the outside in the same direction as the transmissive axis thereof. The polarizing layer 110 may be formed of, but is not limited to, an elongated polyvinyl alcohol (PVA)-based film in which dichroic dye is adsorbed and cultivated. A thickness of the polarizing layer 110 may be about 5 μm to about 40 μm. However, the thickness of the polarizing layer 110 is not limited thereto.

The infrared reflective layer 120 is a layer for allowing visible rays to pass through, and reflecting infrared rays (heat rays) having a specific wavelength. Here, the infrared rays may be light (electromagnetic waves) having a wavelength of about 750 mn or more, The infrared reflective layer 120 may have a reflective band of a specific wavelength range. For example, a reflective band of the infrared reflective layer 120 may be a predetermined wavelength band within a range of about 750 nm to about 3 μm in to reflect near-infrared rays. However, the reflective band is illustrative, and the present invention is not limited thereto.

The phase difference layer 130 is a layer for changing a polarization state of light travelling trough it. For example, the phase difference layer 130 may be a quarter wave plate (QWP) having a λ/4 plate property, which converts linearly polarized light into circularly polarized light. The phase difference layer 130 may emit the large amount of light to the outside by a method of reversing a phase of moving light and assigning a phase difference. Accordingly, the liquid crystal display panel 200 may advantageously exhibit a high luminance property.

Alternatively, the phase difference layer 140 may include a half wave plate (HWP) having a λ/2 plate property, which shifts the polarization direction of linearly polarized light. Alternatively, the phase difference layer 140 may be formed of a combination of the QWP and the HWP.

When the phase difference layer 140 is implemented by using the QWP or the HWP, the QWP or the HWP may include a cyclo olefin polymer (COP) film, a tri-acetyl cellulose (TAC) film, a polycarbonate (PC) film, and the like. The COP film, the TAC film, and the PC film may be a film elongated in left and right, and front and rear directions, or a film elongated in a slope direction. The COP film, the TAC film, and the PC film may have thicknesses of about 15 μm to about 45 μm.

The QWP and the HWP may include a liquid crystal compound which is coated on a layer. Since the liquid crystal compound is birefringent (or birefractive), the liquid crystal compound may perform the functions of the QWP and the IMP. When the QWP and the HWP are implemented by using the liquid crystal compound as described above, each of the QWP and the HWP may have a thickness of about 2 μm.

The infrared reflective layer 120 may be attached to at least one of the polarizing layer 110 and the phase difference layer 130 using a primer layer, which will be described in detail below.

The surface treatment coating layer 140 is a layer to reduce reflection from the display device 10 to increase contrast of an image displayed by the display device 10, and may be disposed on one side of the phase difference layer 130 and surface treated with at least one of anti-glare, anti-reflective, and hard coating. The coating layer 160 and the phase difference layer 140 may be attached to the passivation layer 150 and the phase difference layer 130, respectively, using pressure sensitive adhesives (PSA), which are not shown in FIG. 3, but the present invention is not limited thereto.

The passivation layer 150 may protect the polarizing layer 110. The passivation layer 150 is disposed on the other side of the polarizing layer 110 as illustrated in FIG. 3. The passivation layer 150 may have a phase compensating function. In this case, the passivation layer 150 may include a phase difference compensating film. For example, the phase difference compensating film may be disposed in a surface of the passivation layer 150. Alternatively, the passivation layer 150 may be formed of a material having a non-optical property. For example, the passivation layer 150 does not change a polarization state of the linearly polarized light by the polarizing layer 110.

For example, the passivation layer 150 may be a film including a thermoplastic resin, such as a polyester-based resin including polyethylene terephthalate, polyethylene isophthalate, and polybutylene terephthalate, a cellulose-based resin including diacetyl cellulose and triacetyl cellulose, a polycarbonate-based resin, an acryl-based resin including polymethyl(meta) acrylate and polyethyl(meta) acrylate, a styrene-based resin including polystyrene and acrylonitrile-styrene copolymer, a polyolefin resin including polyethylene, polypropylene, and cyclo-based or norbornene-based structure, a polyolefin-based resin including an ethylene propylene copolymer, a vinyl chloride-based resin, a poly amide-based resin including nylon and aromatic polyamide, an imide-based resin, a polyether sulfone-based resin, a sulfone-base resin, a polyetherkethone-based resin, a polyphenylene sulfide resin, as vinyl alcohol-based resin, a vinylidene chloride resin, a vinyl butyric resin, an arylate-based resin, a polyoxymethylene resin, and an epoxy-based resin, and also be a film including a blended material of the thermoplastic resins. Further, the passivation layer 150 may also include a film formed of a thermosetting resin or an ultraviolet curable resin, such as a (meta)acryl-based resin, a urethane-based resin, an epoxy-based resin, and a silicone-based resin.

The adhesive layer 160 may be attached to an upper surface of the second base substrate 221 to serve to fix the polarizing plate 100 to the liquid crystal display panel 200. Although not shown in FIG. 1, an adhesive layer may be used to attach the second polarizing plate 300 to the first base substrate 212.

The mutual adhesion of the polarizing layer 110, the infrared reflective layer 120, and the phase difference layer 130 described above will be described in detail below.

Although not shown in FIG. 3, a primer layer is used to attach the infrared reflective layer 120 to another member, to increase adhesive force of the infrared reflective layer 120 and surface hardness.

Figure 4:
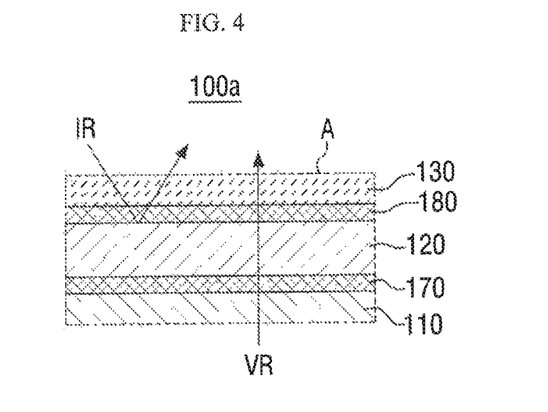
FIG. 4 is an enlarged view of part A of FIG. 3 according to an exemplary embodiment of the present invention.

FIG. 4 is an enlarged view of part A of FIG. 3 according to an exemplary embodiment of the present invention.

Referring to FIG. 4, the part A 100a of the first polarizing plate 100 according to an exemplary embodiment of the present invention includes a first primer layer 180 disposed on one side of the infrared reflective layer 120 and a second primer layer 170 disposed on the other side of the infrared reflective layer 120. The infrared reflective layer 120 may allow visible rays VR to pass through, and reflect infrared rays (heat rays) IR having a specific wavelength.

The first primer layer 180 attaches the infrared reflective layer 120 to the phase difference layer 130, For example, the infrared reflective layer 120 is attached to the phase difference layer 130 through the first primer layer 180 to increase adhesive force and surface hardness, compared to the attachment using only the PSAs.

The second primer layer 170 attaches the infrared reflective layer 120 to the polarizing layer 110. The infrared reflective layer 120 is attached to the polarizing layer 110 through the second primer layer 170 to increase adhesive force and surface hardness, compared to the attachment using only the PSAs.

The first primer layer 180 and the second primer layer 170 may be formed by a primer treatment process. The primer treatment may serve to increase attachment force of a general polymer film with a polymer film, a UV resin, and the like by performing a polymer-treatment onto the general polymer film. A polymer material used in the primer treatment may be an acryl-based material, an ester-based material, a urethane-based material, or a siloxane-based material, and a water soluble polymer material for preventing a fire danger.

The primer treatment process may be performed by a method of applying the aforementioned polymer material on a base, which is to be primer treated, and coating the base by using a coater.

The first primer layer 180 and the second primer layer 170 may have thicknesses of about 3 nm to about 300 nm. For example, the first primer layer 180 may have a thickness of about 30 nm or more. If the first primer layer 180 has a thickness less than about 30 nm, the first primer layer 180 may have small increase in adhesive force.

The infrared reflective layer 120 is attached to the phase difference layer 130 and the polarizing layer 110 using the first primer layer 180 and the second primer layer 170 disposed on both sides thereof, respectively. However, the present invention is not limited thereto, and the infrared reflective layer 120 may further include a PSA layer disposed at any one between one side of the first primer layer 180 and the other side of the second primer layer 170.

Figure 5:
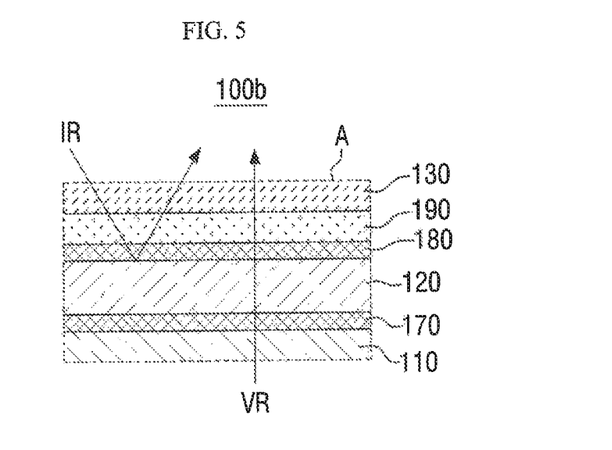
FIG. 5 is an enlarged view of part A of FIG. 3 according to an exemplary embodiment of the present invention.
Figure 6:
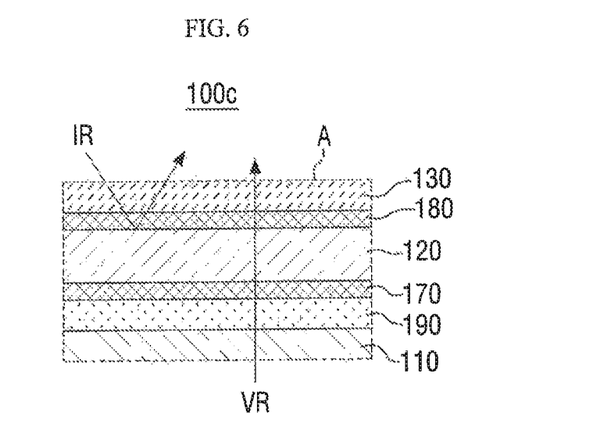
FIGS. 6 to 8 are enlarged views of part A of FIG. 3 according to an exemplary embodiment of the present invention.

FIG. 5 is an enlarged view of part A of FIG. 3 according to an exemplary embodiment of the present invention. FIG. 6 is an enlarged view of part A of FIG. 3 according to an exemplary embodiment of the present invention.

Referring to FIG. 5, the part A 100b of the first polarizing plate 100 according to an exemplary embodiment of the present invention is different from the part A 100b of the first polarizing plate 100 in FIG. 4 in that a PSA layer 190 (see FIG. 5) is further included in the part. A 100b, and other configurations may be substantially the same as or similar to those of FIG. 4. Such difference will be described below.

The part A 100b of the first polarizing plate 100 further includes the PSA layer 190 disposed on one side of a first primer layer 180 which serves to attach an infrared reflective layer 120 to a phase difference layer 130. For example, the infrared reflective layer 120 is attached to the phase difference layer 130 using the first primer 180 and the PSA layer 190 interposed between the infrared reflective layer 120 and the phase difference layer 130.

Referring to FIG. 6, the part A 100c of the first polarizing plate 100 according to an exemplary embodiment of the present invention is different from the part A of the first polarizing plate 100 in FIG. 4 in that a PSA layer 190 (see FIG. 6) is further included, and other configurations may be substantially the same as or similar to those of FIG. 4. Such difference will be described below.

The part A 100c of the first polarizing plate 100 further includes the PSA layer 190 disposed on one side of a second primer layer 170 which serves to attach an infrared reflective layer 120 to a polarizing layer 110. For example, the infrared reflective layer 120 is attached to the polarizing layer 110 using the second primer 180 and the PSA layer 190 which are interposed between the infrared reflective layer 120 and the polarizing layer 110.

The infrared reflective layer 120, shown in FIGS. 5 and 6, is attached to the phase difference layer 130 and the polarizing layer 110 using the first primer layer 180 and the second primer layer 170 disposed at both sides of the reflective layer 120, and the PSA layer 190 disposed on one side of the first primer layer 180 and one side of the second primer layer 170. However, the present invention is not limited thereto. For example, a primer layer may be disposed on only one side of the infrared reflective layer 120, and a PSA layer may be disposed on the other side where the primer layer is not disposed.

Figure 7:
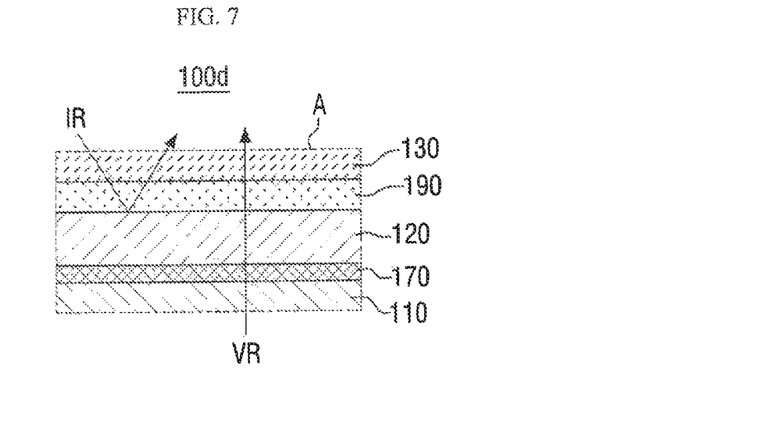
Figure 8:
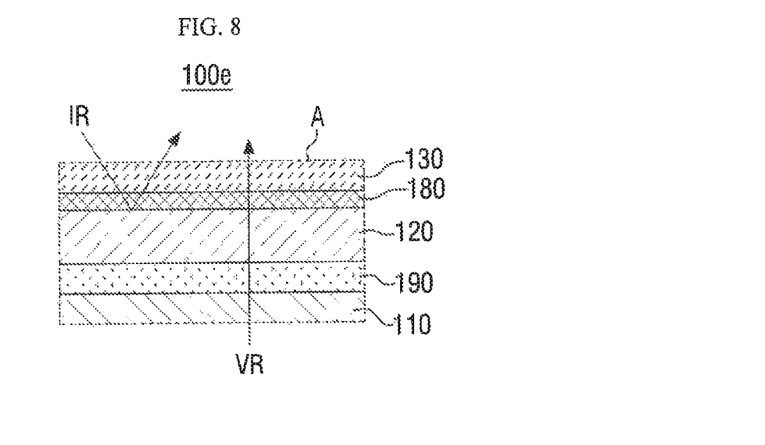

FIGS. 7 to 8 are enlarged views of part A of FIG. 3 according to exemplary embodiments of the present invention.

Referring to FIG. 7, the part A 100d of the first polarizing plate 100 is different from the part A 100a in the FIG. 4 in that a PSA layer 190 is included instead of the first primer layer 180 (see FIG. 4), and other configurations may be substantially the same as or similar to those of FIG. 4. Such difference will be described below.

The part A 100d of the first polarizing plate 100 includes the PSA layer 190 disposed on one side of an infrared reflective layer 120, and a primer layer 170 disposed on the other side of the infrared reflective layer 120. The infrared reflective layer 120 is attached to a phase difference layer 130 using the PSA layer 190, and to a polarizing layer 110 using the primer layer 170.

Referring to FIG. 8, the part A 100e of the first polarizing plate 100 is different from the part A 100a of the first polarizing plate 100 in FIG. 4 in that a PSA layer 190 is included instead of the second primer layer 170 (see FIG. 4), and other configurations may be substantially the same as or similar to those of FIG. 4. Such difference will be described below.

The part A 100e of the first polarizing plate 100 includes the PSA layer 190 disposed on one side of an infrared reflective layer 120, and a primer layer 180 disposed one the other side of the infrared reflective layer 120. The infrared reflective layer 120 is attached to a polarizing layer 110 using the PSA layer 190, and to a phase difference layer 130 using the primer layer 180.

According to an exemplary embodiment, the first polarizing plate 100 may include the polarizing layer 110, the infrared reflective layer 120, and the phase difference layer 130, which are stacked on each other as illustrated in FIGS. 4 to 8. However, the present invention is not limited thereto, the first polarizing plate 100 may be implemented by stacking the polarizing layer 10, the phase difference layer 130, the infrared reflective layer 120, and the surface treatment coating layer 140 on each other.

Figure 9:
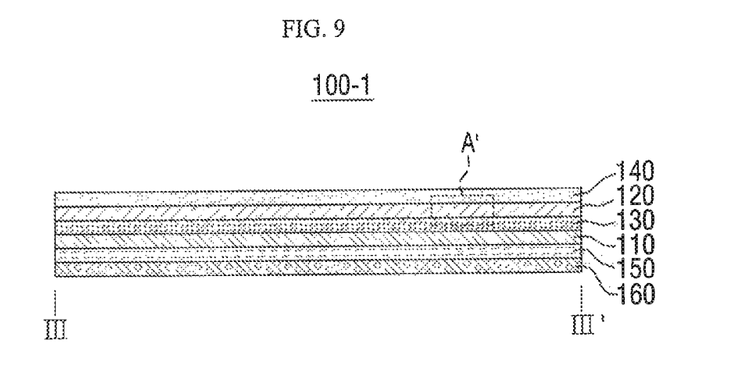
FIG. 9 is a cross-sectional view taken along line III-III' of FIG. 2 according to an exemplary embodiment of the present invention.

FIG. 9 is a cross-sectional view taken along line III-III' of FIG. 2 according to an exemplary embodiment of the present invention.

Referring to FIG. 9, a first polarizing plate 100-1 is different from the first polarizing plate 100 of the FIG. 3 in that the first polarizing plate 100-1 include an infrared reflective layer 120 and a phase difference layer 130 stacked in a different order from those of FIG. 3, and other configurations may be substantially the same as or similar to those of FIG. 3. Such difference will be described below.

The first polarizing plate 100-1 may include a primer layer disposed on at least one side of the infrared reflective layer 120. The infrared reflective layer 120 may be attached to at least one of a polarizing layer 110 and a surface treatment coating layer 140 using the primer layer.

In an exemplary embodiment, the infrared reflective layer 120 may be attached to the polarizing layer 110 and the surface treatment coating layer 140 using primer layers disposed on both sides of the infrared reflective layer 120. For example, part A' of FIG. 9 may have a similar structure to that of part A illustrated in FIG. 4, except for the stacked order of the infrared reflective layer 120 and the phase difference layer 130.

For example, the part A' of FIG. 9 may have a structure in which a first primer layer 180 is disposed on one side of the infrared reflective layer 120, and a second primer layer 170 is disposed on the other side of the infrared reflective layer 120 as illustrated in part A of FIG. 4. The infrared reflective layer 120 may be attached to the surface treatment coating layer 140 using the first primer layer 180, and the phase difference layer 130 by the second primer layer 170.

In an exemplary embodiment, a PSA layer, shown in FIG. 9, is disposed on one side of a primer layer, as shown in FIGS. 5 and 6.

For example, part A' of FIG. 9 may include the PSA layer 190 disposed on one side of the first primer layer 180, as shown in FIG. 5. The first primer layer 180 may be disposed on one side of the infrared reflective layer 120. The infrared reflective layer 120 may be attached, using the PSA layer, to the surface treatment coating layer 140. The infrared reflective layer 120 may be attached to the surface treatment coating layer 140 using the first primer layer 180 and the PSA layer 190 which are stacked on one side of the infrared reflective layer 120. The infrared reflective layer 120 may be attached to the phase difference layer 130 using the second primer 170.

For example, part A' of FIG. 9 may include the PSA layer 190 disposed on one side of the second primer layer 170, as shown in FIG. 6. The infrared reflective layer 120 may be attached, using the PSA layer, to the phase difference layer 130. The infrared reflective layer 120 may be attached to the phase difference layer 130 using the second primer 170 and the PSA layer 190 which are sequentially stacked on one side of the infrared reflective layer 120. The infrared reflective layer 120 may be attached to the surface treatment coating layer 140 using the first primer 180 disposed on the other side of the infrared reflective layer 120.

In an exemplary embodiment, a primer layer, not shown in FIG. 9, may be disposed on one side of the infrared reflective layer 120, and a PSA layer may be disposed on the other side where the primer layer is not disposed. For example, part A' of FIG. 9 may have substantially the same structure to those of parts A illustrated in FIGS. 7 and 8, except that the stacking order of the infrared reflective layer 120 and the phase difference layer 130.

For example, part A' of FIG. 9 may include the PSA layer 190 disposed on one side of the infrared reflective layer 120, and the second primer layer 170 disposed on the other side of the infrared reflective layer 120, as illustrated in part A of FIG. 7. The infrared reflective layer 120 may be attached to the surface treatment coating layer 140 using the PSA layer 190, and to the phase difference layer 130 by the second primer layer 170.

For example, part A' of FIG. 9 may include the PSA layer 190 disposed on one side of the infrared reflective layer 120, and the first primer layer 180 disposed on the other side of the infrared reflective layer 120, as illustrated in part A of FIG, 8. The infrared reflective layer 120 may be attached to the phase difference layer 130 using the PSA layer 190, and to the surface treatment coating layer 140 using the first primer layer 180.

While the present invention has been shown and described with reference to exemplary embodiments thereof it will be apparent to those of ordinary skill in the art that various changes in form and detail may be made therein without departing from the spirit and scope of the inventive concept as defined by the following claims.

What is claimed is:

1. A polarizing member, comprising:
   a polarizing layer which linearly polarizes light and emits polarized light;
   a phase difference layer which changes a polarization state of the polarized light; and
   an infrared reflective layer interposed between the polarization layer and the phase difference layer;
   a first primer layer interposed between the infrared reflective layer and the phase difference layer, wherein the infrared reflective layer is attached to the phase difference layer through the first primer layer; and
   a second primer layer interposed between the infrared reflective layer and the polarizing layer, wherein the infrared reflective layer is attached to the polarizing layer through the second primer layer,
   wherein the polarized light passes through the infrared reflective layer and infrared rays are reflected from the infrared reflective layer, and wherein the infrared reflective layer is attached to the polarizing layer and the phase difference layer.

2. The polarizing member of claim 1, further comprising:
a pressure sensitive adhesive layer disposed on any one of the first primer layer and the second primer layer.

3. The polarizing member of claim 1, further comprising:
a pressure sensitive adhesive layer interposed between the polarizing layer and the second primer layer.

4. The polarizing member of claim 1,
wherein the phase difference layer includes a liquid crystal compound.

5. A display device, comprising:
a display panel configured to emit light to display an image;
a polarizing member disposed on the display panel, and configured to polarize light emitted from the display panel;
wherein the polarizing member includes:
  a polarizing layer which linearly polarize the light and emit polarized light;
  a phase difference layer which changes a polarization state of the polarized light; and
  an infrared reflective layer interposed between the polarization layer and the phase difference layer, wherein the polarized light passes through the infrared reflective layer and infrared rays are reflected from the infrared reflective layer; and
  a first primer layer interposed between the infrared reflective layer and the phase difference layer, wherein the infrared reflective layer is attached to the phase difference layer through the first primer layer; and
  a second primer layer interposed between the infrared reflective layer and the polarizing layer, wherein the infrared reflective layer is attached to the polarizing layer through the second primer layer, and
wherein the polarizing layer, the phase difference layer and the infrared reflective layer are laminated without having a gap therebetween.

6. The display device of claim 5, further comprising:
a pressure sensitive adhesive layer disposed on any one of the first primer layer and the second primer layer.

7. The display device of claim 5, further comprising:
a pressure sensitive adhesive layer interposed between the polarizing layer and the second primer layer.

8. The display device of claim 5,
wherein the phase difference layer includes a liquid crystal compound.

9. A display device, comprising:
a display panel configured to emit light to display an image;
a polarizing member disposed on the display panel, and configured to polarize light emitted from the display panel;
wherein the polarizing member includes:
  a polarizing layer which linearly polarizes the light and emit polarized light;
  a phase difference layer which changes a polarization state of the polarized light;
  an infrared reflective layer interposed between the polarizing layer and the phase difference layer, wherein the polarized light passes through the infrared reflection layer and infrared rays are reflected from the infrared reflective layer; and
  a first primer layer interposed between the infrared reflective layer and the phase difference layer, wherein the infrared reflective layer is attached to the phase difference layer through the first primer layer; and
  a second primer layer interposed between the infrared reflective layer and the polarizing layer, wherein the infrared reflective layer is attached to the polarizing layer through the second primer layer; and
  a surface treatment coating layer disposed on the phase difference layer,
  wherein the phase difference layer is interposed between the surface treatment coating layer and the infrared reflective layer, and
  wherein the surface treatment coating layer is in direct contact with the phase difference layer.

10. The display device of claim 9, further comprising:
a pressure sensitive adhesive layer disposed on any one of the first primer layer and the second primer layer.

11. The display device of claim 9, further comprising:
a pressure sensitive adhesive layer interposed between the polarizing layer and the second primer layer.

12. The display device of claim 9,
wherein the phase difference layer includes a liquid crystal compound.

13. The display device of claim 1,
wherein the polarizing layer, the phase difference layer and the infrared reflective layer are laminated without having a gap therebetween.

14. The display device of claim 5,
wherein the infrared reflective layer is attached to the polarizing layer and the phase difference layer.

* * * * *